US005774729A

United States Patent [19]

Carney et al.

[11] Patent Number: 5,774,729
[45] Date of Patent: Jun. 30, 1998

[54] EVENT HANDLING IN A HIGH LEVEL PROGRAMMING LANGUAGE ENVIRONMENT

[75] Inventors: William Peter Carney, San Jose; Laurence Edward England, Morgan Hill; Gary John Hochmuth; Brian Owings, both of San Jose; Eric Lynn Porter, Fremont; Alfred William Shannon, Morgan Hill; Robert Aaron Wilson, San Jose, all of Calif.

[73] Assignee: International Business Machines Corporation, Armonk, N.Y.

[21] Appl. No.: 159,063

[22] Filed: Nov. 29, 1993

Related U.S. Application Data

[63] Continuation of Ser. No. 810,619, Dec. 19, 1991, abandoned.

[51] Int. Cl.$^6$ .................................................. G06F 7/20
[52] U.S. Cl. .................................. 395/707; 395/708
[58] Field of Search ...................... 364/DIG. 1, DIG. 2; 395/700, 650, 707, 708

[56] References Cited

U.S. PATENT DOCUMENTS

| | | | |
|---|---|---|---|
| 4,041,467 | 8/1977 | Cota et al. | 364/700 |
| 4,862,349 | 8/1989 | Foreman et al. | 395/700 |
| 4,868,745 | 9/1989 | Patton et al. | |
| 4,916,610 | 4/1990 | Bapat | 395/700 |
| 4,992,971 | 2/1991 | Hayashi | 364/900 |
| 5,075,847 | 12/1991 | Fromme | 395/700 |
| 5,097,533 | 3/1992 | Burger et al. | 395/500 |
| 5,146,593 | 9/1992 | Brandle et al. | 395/700 |
| 5,218,699 | 6/1993 | Brandle et al. | 395/650 |
| 5,230,049 | 7/1993 | Chang et al. | 395/700 |
| 5,355,484 | 10/1994 | Record et al. | 395/650 |
| 5,455,949 | 10/1995 | Conder et al. | 395/700 |

FOREIGN PATENT DOCUMENTS

| | | | |
|---|---|---|---|
| 264317 | 9/1987 | France | G06F 9/46 |
| 399822 | 5/1990 | United Kingdom | G06F 9/44 |

OTHER PUBLICATIONS

Zave, A Compositional Approach to Multiparadigm Programming, IEEE Software, Sep. 1989, V6 Issue 5, pp. 15–25.

Hayes et al, Facilitating Mixed Language Programming in Distributed Systems, IEEE Transactions of Software Engineering, vol. SE–13, No. 12, Dec. 1987, pp. 1254–1264.

(List continued on next page.)

*Primary Examiner*—Lucien U. Toplu
*Attorney, Agent, or Firm*—Marilyn Smith Dawkins, Esq.; Sterne, Kessler, Goldstein & Fox P.L.L.C.

[57] ABSTRACT

A method and means for handling events in a computer system which occur during the execution of programs including routines prepared in a plurality of computer programming languages is described. The number and identity of each unique computer programming language used in the preparation of the program is determined using a language list contained in the application program. A unique event handling means (event handler) is initialized for each unique computer programming language used in the program. As the program executes selected events of interest to the event handlers are detected. The parameters associated with the selected event are determined. Optionally the detected events may be divided into two types: broadcast or targeted. Broadcast events are sent to all event handlers (except the debug event handler), whereas, the targeted events are sent to a single event handler. An event code and the relevant parameters are passed to the event handlers so that each event handler may perform whatever actions are appropriate for that event in the context of the programming language being supported. The event handlers generate an appropriate return code indicating the success, failure, or non-processing of the event and, for selected events, return request information. The invention provides for a separate specialized debug event handler.

17 Claims, 5 Drawing Sheets

OTHER PUBLICATIONS

Demurjian et al, Towards a Better Understanding of Data Models through the Multilingual Database System, IEEE Trans. on Soft. Engr., V14, No. 7, Jul. 1988, pp. 946–958.

Notkin et al, Interconnecting Heterogeneous Computer Systems, Communications of the ACM, Mar. 1988 V31 N3 p. 258(16).

Hansen, Angie, New Compiler Technology Boosts Microsoft Quickbasic H.O Productivity, Microsoft Systems Journal May 1988 V3 N3 p. 49(14).

```
CEEBLLST CSECT ,           CEE LANGUAGE LIST HEADER
CEEBLLST RMODE ANY
CEEBLLST AMODE ANY
         ...
* Start of the actual Language List
         ENTRY CEELLIST
CEELLIST DS    0D          CEE LANGUAGE LIST
         WXTRN CEESG000
         DC    A(CEESG000)  00 unassigned
         WXTRN CEESG001
         DC    A(CEESG001)  01 common services
         WXTRN CEESG002
         DC    A(CEESG002)  02 compiler-x
         WXTRN CEESG003
         DC    A(CEESG003)  03 compiler-y
         WXTRN CEESG004
         DC    A(CEESG004)  04 program-x
         WXTRN CEESG005
         DC    A(CEESG005)  05 compiler-z
         WXTRN CEESG006
         DC    A(CEESG006)  06 compiler-j
         WXTRN CEESG007
         DC    A(CEESG007)  07 compiler-k
         WXTRN CEESG008
         DC    A(CEESG008)  08 compiler-l
         WXTRN CEESG009
         DC    A(CEESG009)  09 compiler-m
         WXTRN CEESG010
         DC    A(CEESG010)  10 compiler-n
         WXTRN CEESG011
         DC    A(CEESG011)  11 Debugger
         WXTRN CEESG012
         DC    A(CEESG012)  12 compiler-o
         WXTRN CEESG013
         DC    A(CEESG013)  13 compiler-p
         WXTRN CEESG014
         DC    A(CEESG014)  14 compiler-q
         WXTRN CEESG015
         DC    A(CEESG015)  15 assembler
         WXTRN CEESG016
         DC    A(CEESG016)  16 compiler-r
         DC    A(0)         Dummy entry must contain X'00'
         DS    0D
LLISTEND DC    A(0)         MARK THE END OF LIST
         END
```

Figure 5

EVENT HANDLING IN A HIGH LEVEL PROGRAMMING LANGUAGE ENVIRONMENT

This Application is a continuation of Ser. No. 07/810,619 filed Dec. 19, 1991, now abandoned.

TECHNICAL FIELD

The present invention relates to method systems in the field of program execution management in computer system.

BACKGROUND OF THE INVENTION

The various High Level Languages (HLLs) for computer programming (e.g., (C, COBOL, FORTRAN, PL/I, etc.) have differing run-time event handling requirements. Events which may be defined in one language may not be defined in another.

Execution of programs written in typical programming languages normally requires that language specific run-time support code be present and initialized to enable the code produced by the respective compilers to function correctly. The run-time support will typically include various functions that are required by many if not all programs written in that language. Routines to perform input/output operations would be one example.

It is possible and often desirable to build programs from routines written in several languages. The run-time support should therefore, be able to simultaneously satisfy the requirements of an arbitrary number of languages with differing requirements. It is possible to isolate common routines which appear in many run-time support packages and place them into a common run-time support package which supports multi-language application programs and thereby reduce the size of the language specific support components and reduce redundancy.

A common execution environment establishes a virtual machine interface that the HLLs (which will be called "members") can exercise to manage various resources. Within such a virtual machine, various significant events can occur which mandate actions to be taken by the members which may include "ignore the event." A uniform method for notifying the members of the occurrence of such significant events within the virtual machine and allowing the members to take the appropriate actions is needed. In addition, the virtual machine needs a consistent way to obtain information from the members at discrete points in time, as request the members to perform various activities.

In the prior art intimate knowledge or the disparate specific interface between the base run-time and the HLL-specific components is required (or event handling. What is needed and not provided by the prior art is a method and means for managing event handling during program execution that allows disparate High Level Language routines to interoperate in a single run-time environment.

SUMMARY OF THE INVENTION

The present invention describes a method and means for handling events in a computer system which occur during the execution of programs including routines prepared in a plurality of computer programming languages. The number and identity of each unique computer programming language used in the preparation of the program is determined using a language list or other equivalent means and a unique event handling means (event handler) is initialized for each unique computer programming language. As the program executes selected events of interest to the event handlers are detected. The parameters associated with the selected event are determined. Optionally the detected events may be divided into two types: broadcast or targeted. Broadcast events are sent to all event handlers (which may or may not include the debug event handler), whereas, the targeted events are sent to a single event handler. An event code and the relevant parameters are passed to the event handlers so that each event handler may perform whatever actions are appropriate for that event in the context of the programming language being supported. The event handlers generate an appropriate return code indicating the success, failure, or non-processing of the event and, for selected events, return requested information. The invention provides for a separate specializied debug event handler.

DETAILED DESCRIPTION OF THE INVENTION

The following terms are used in this specification:

CAA

The Common Anchor Area (CAA) is a control block which represents the current state of the execution thread of the application.

CIB

Condition Information Block which contains information about the last condition, i.e., error, exception, etc. that was processed.

Condition

The terms condition and exception are often used interchangeably. These conditions or exceptions may be errors such as using an invalid machine address or attempting to divide by zero. Conditions also include events which may not be actual errors, but which require special attention.

Condition Manager

Is any program or means which gains control of the computer system when a condition occurs and which manages the handling of that condition by executing various system and/or user application routines. It may be part of the operating system, run-time environment or an application program.

DSA

Dynamic Save Area, i.e., a stack frame.

EDB

The Enclave Data Block (EDB) is a control block which represents the current state of the enclave and represents the resources held by the enclave.

Enclave

An enclave is a logical run-time structure that supports the execution of a group of procedures. The first procedure to be invoked within the enclave is known as the "main" procedure; the others are "sub-" procedures. The enclave limits the scope of high level language semantics, including shared storage, and termination. An enclave comprises one or more threads.

Feedback Code

A leedback code is the encapsulation of a condition or error.

Heap Storage

An unordered group of occurrences or program storage areas that may be associated with programs running with a process. That is, the program storage areas of a particular type can be viewed as a heap where there is no logical ordering of the acquisition and disposal of occurrences, and where the occurrence of a program storage area in the heap is unspecified.

Invocation

An invocation is an execution instance of a code "procedure" that has received control by a logical call/return mechanism.

OCB

The Options Control Block (OCB) is a control block which contains the current settings of the run-time options.

PCB

The Process Control Block (PCB) is a control block which represents the current state of the process and represents the resources held at the process level.

Platform

Is the combination of an operating system and computer hardware on which programs may execute.

Procedure

A compilation unit that corresponds to the smallest source sequence that can be separately compiled without changing semantics.

Process

A process is the outermost run-time structure whose characteristics are described by the run-time environment. There is no hierarchical relationship among processes. Rather, each process independently and asynchronously competes for some system resources, while owning others, notably a logically separate "address space." A process comprises one or more enclaves.

PPA

Program Prologue Area which is generated by standard compilers and contains information about the compiled unit.

Stack frame

A stack frame is one element of a stack. A stack frame is created each time that a procedure is called and delete deleted when the procedure returns for the call. It is used to manage resources associated with the procedure invocation execution and return.

Stack Frame Zero

Is the conceptual stack frame immediately prior to the stack flames for the first routine. It is the theoretical place where the thread or task is initialized, the first procedure is called from and termination is initiated from, for the purpose of condition handling, the zero-th stack frame is the frame at which the default actions for a language are applied.

Static storage

A program's working storage that gets a new allocation the first time the program is run within an enclave and is not automatically deallocated when the program returns. Static storage is persistent across multiple runs of the program within an enclave.

Thread

A thread is the basic unit of execution within the run-time environment program model. The resources that it owns are a machine state, a stack and a a logically distinct condition manager. Each thread competes asynchronously for execution.

Figure 1:
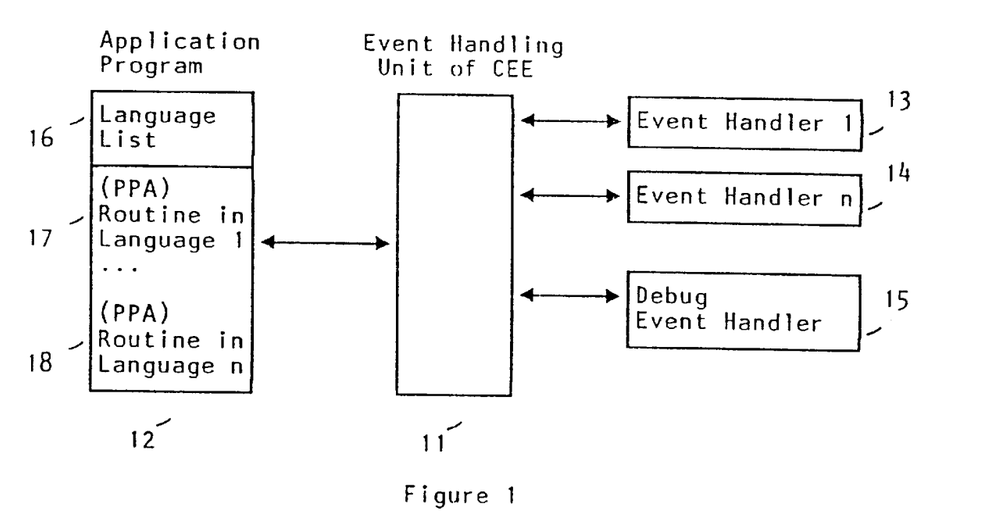
FIG. 1 is a block diagram showing the relationship between an application program, the event handling unit of the Common Execution Environment (CEE) and the Event Handlers according to the invention.

The invention is implemented in the interfaces between the unique run-time event handling modules associated with the various high level language compilers and the Event Handling Unit (EHU) of a common execution environment (CEE). FIG. 1 shows the block components in a system based on the invention. The Event Handling Unit of CEE 11 interfaces between the application program 12 and the event handlers 13–15. The CEE and the event handlers run in the problem state as a program separate from the operating system, but they can easily be included as part of the operating system without essential modification being required. The application program (which will usually be simply called the program) contains a language list 16 which identifies all of the HLLs used in the preparation of the program's various components. Each routine (compilation unit) 17–18 should contain an indication of the language in which it was written. This is preferably done by placing an assigned member number in the Program Prologue Area (PPA).

Figure 2:
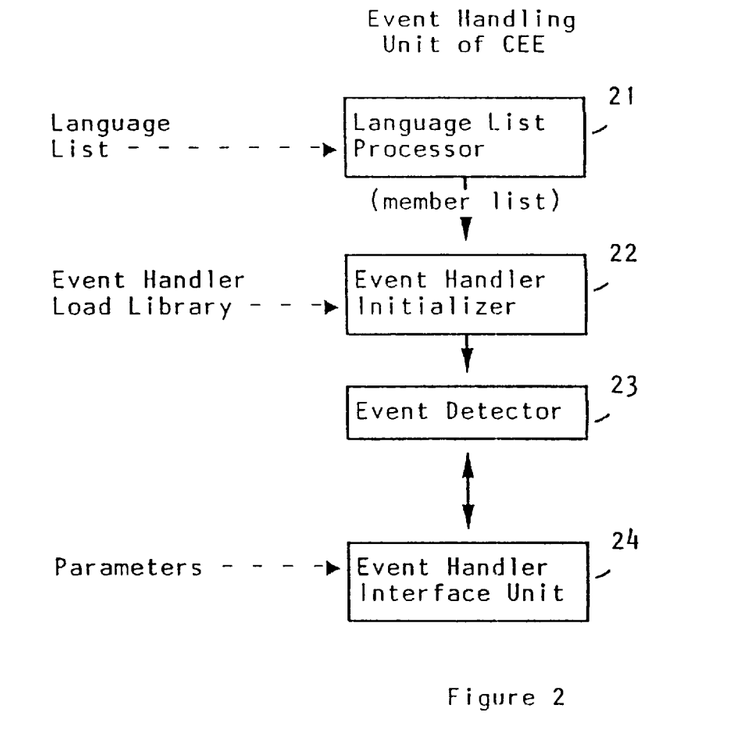
FIG. 2 is a block diagram of the major components of the event handling unit of the CEE according to the invention.

FIG. 2 shows the major components of the EHU. The Language List Processor 21 is responsible for finding and interpreting the contents of the language list inside the application program. The output is a list of members which is then used by the Event Handler Initializer 22 to load the needed Event Handlers from the load library. The Event Handler Initializer allows the Event Detector 23 to become active after initialization has completed. When the occurrence of any relevant event is detected by the Event Detector then the Event Handler Interface Unit 24 gathers the needed parameters and passes them along with an event code which idenitifies the type of event to one or more Event Handles. The Event Handler Interface Unit also receives the return code and any return information supplied by the Event Handler. The detection of the events can be performed by well known prior art means. Typically the events may be explicit in the actions of the program. For example, when the program terminates it will explicitly notify CEE, which will then cause the appropriate event handlers to be driven. Implicit events may be associated with errors or other conditions which occur during the execution of the program.

When a defined event occurs the CEE must make a number of determined in order to properly route it to the correct Event Handler(s). The basic type of the event will determine what parameters, if any, should be passed to the Event Handler and whether the event is potentially of interest to all of the Event Handlers or whether only a single Event Handler should be invoked. If the event is determined to be of interest only to the Event Handler which corresponds to the currently executing routine, then the identity of that Event Handler is ascertained by examining the current routine's PPA which should contain the member code. This type of event will he said to be 'targeted' to one Event Handler. Events which will be passed sequentially to all Event Handlers will be said to be 'broadcast'. The specific embodiment of the invention will determine which events need to be broadcast and which do not. Each Event Handler has the option of taking no action when invoked for a particular event. If the PPA does not contain a member code, then an event which might be otherwise targeted can be broadcast until the owner of the event is found.

Figure 3:
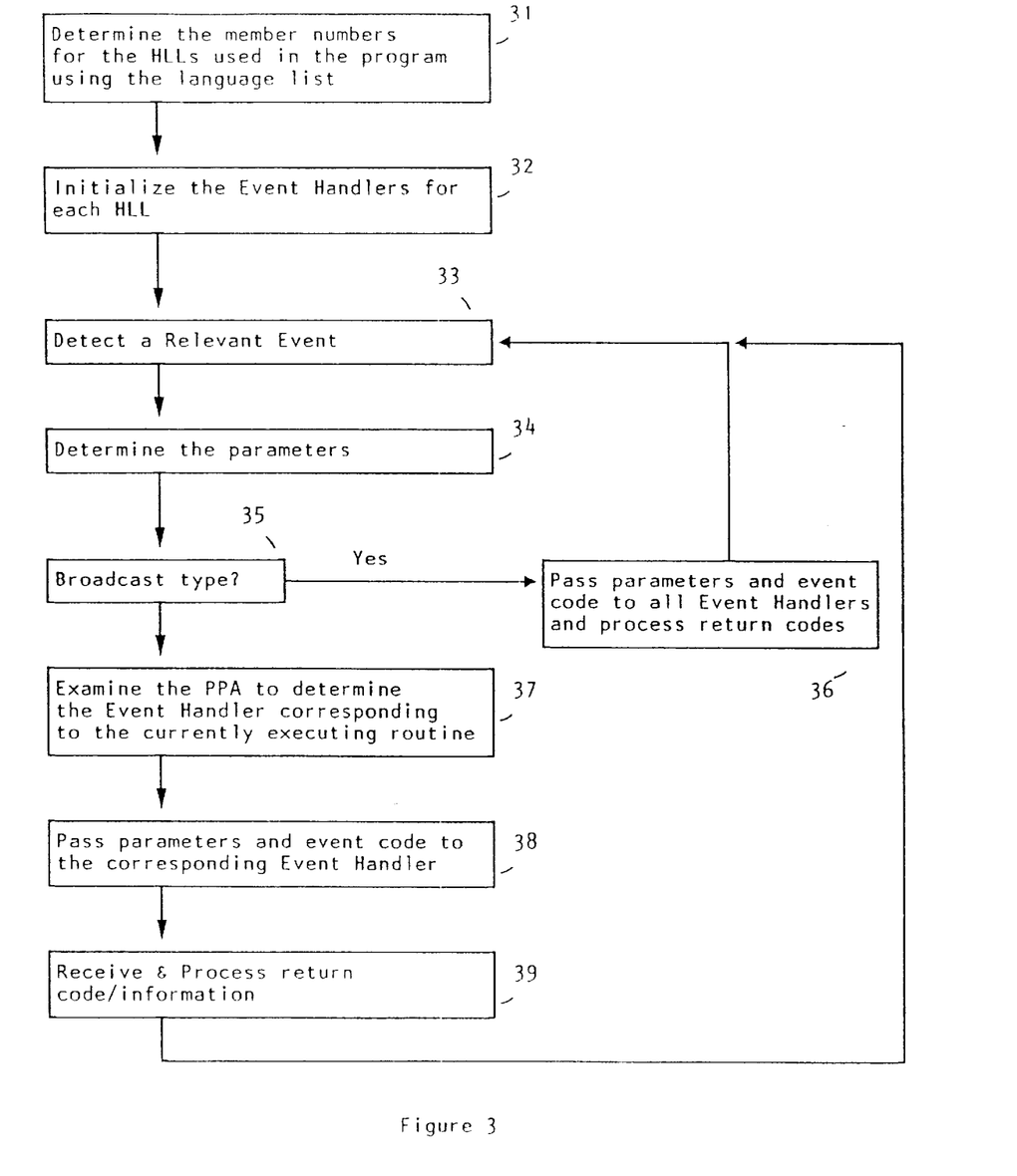
FIG. 3 is a diagram of the major steps executed by the event handling unit according to the invention.

FIG. 3 shows the major steps executed by the EHU according to the invention. The identity of the languages used in the program are determined from the language list contained in the program 31, then the Event Handler is initialized for each language 32. When a relevant event is detected 33, the associated parameters are determined 34. The decision is made as to whether to broadcast the event 35, and if so, the event code and parameters are passed to each Event Handler. Each Event Handler must at least return a return code which is then processed appropriately 36. For non-broadcast events the identity of the correct Event Handler is determined from the member number which is, contained in the PPA of the currently executing routine 37. An event code and parameters 38 are passed to the identified Event Handler and the return information is processed after the Event Handler completes 39.

The invention separates the generalized execution environment and the unique requirements of individual HLLs and debuggers through the Event Handler and the Debugger Event Handler respectively. The interfaces provided by the event handlers allow additional languages and debuggers to run in CEE without requiring CEE to have intimate knowledge of any particular HLL or debugger.

The invention operates by:

providing a mechanism to positively identify the presence of a member within the virtual machine establishing a means of communication from the virtual machine to the members within the virtual machine, notifying the member of significant events defining an interface for the communication of such events and the responses from the members providing a framework within which the member can carry out its desired actions for the significant events that occur providing a mechanism that will provide information from the members to the virtual machine.

In order to properly interface with CEE as a participating HLL member, the member must provide an Event Handler in the form of a loadable module. CEE requests that the Event Handler be loaded using standard operating system functions and the starting address of the executable code is returned to CEE by the operating system. This provides the mechanism by which CEE communicates the occurrence of various significant events and by which CEE receives information from the members. The number of unique members is arbitrarily limited to 256 in the preferred embodiment because only one byte is used for the member code.

Figure 4:
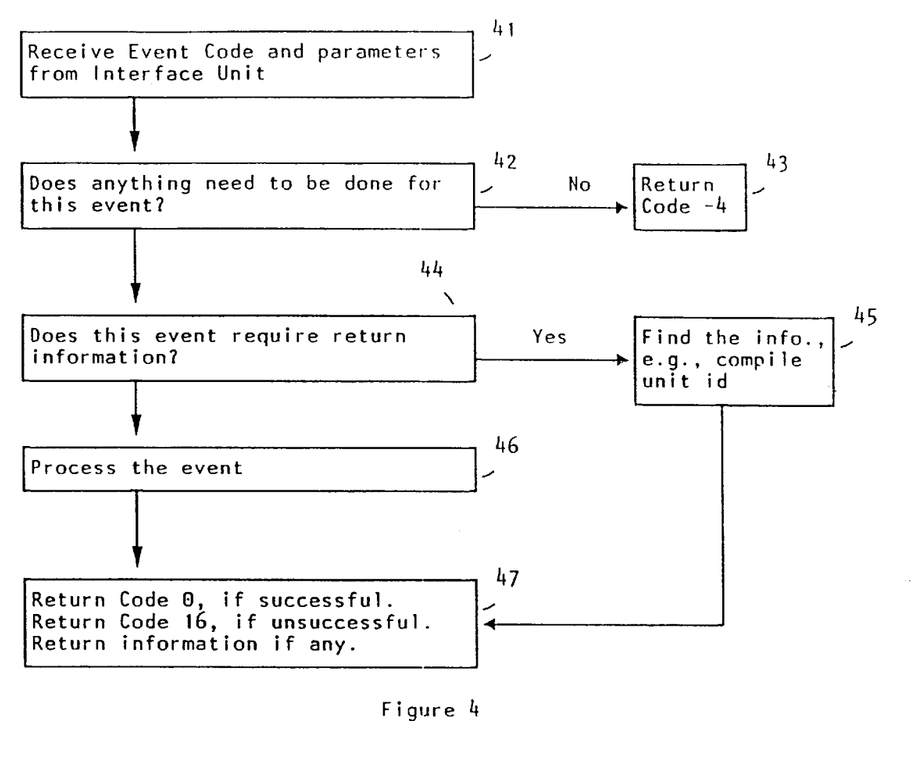
FIG. 4 is a diagram of the major steps in the operation of an event handler according to the invention.

FIG. 4 shows an overview or the actions which need to be taken by an Event Handler when invoked by CEE. The Event Code and parameters must be received from the Interface Unit 41. The initial determination is made as to whether the event requires any action at all by this particular Event Handler. A return code of −4 is used when no action is taken. Since some events require return information to be supplied to CEE, these events must be handled separately 45. The remaining events will be processed according to prior art techniques as is appropriate for the particular language 46. A success or failure return code is returned to CEE along with any requested information, if any, 47.

An interactive debugger is usually interested in a set of events that is usually distinct from the set of events in which members are interested. This communication of significant events is provided via a distinct event handler known as a Debugger Event Handler. In particular, a Debugger Event Handler must be provided by a participating debugger. There may be many participating debuggers available, but only one of the available debuggers, with its associated Debugger Event Handler may be used with any specific execution of a program.

Language List

Figure 5:
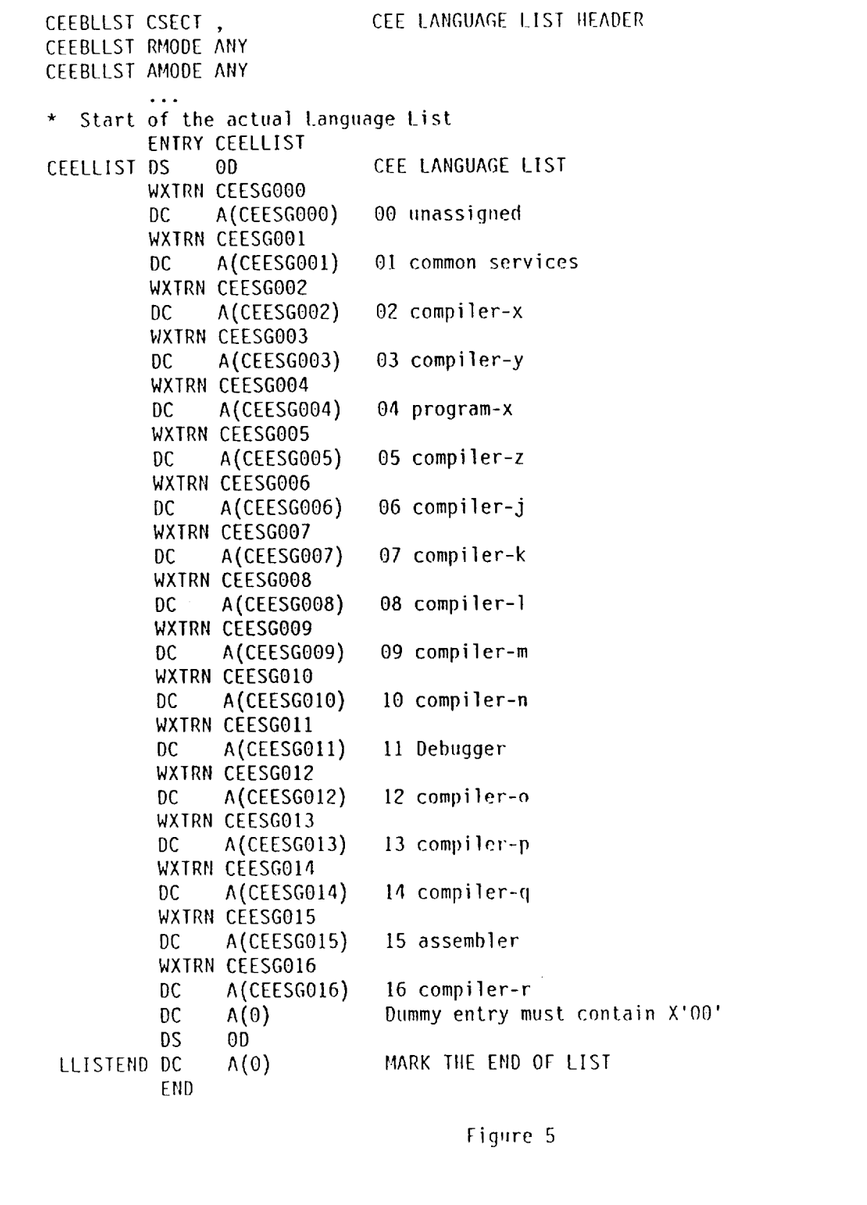
FIG. 5 is a sample of assembler language source code used to create language list as used according to the invention.

CEE determines which members are present during environment initialization by examining the language list contained in the program. This is accomplished through the following steps:

1. Each member must provide a "signature CSECT" that has a fixed-format name.
2. A vector of weak external references for a set of member signature CSECT names is established.
3. If a member is present in the application (i.e., load module), the standard link edit process will place the address for that member's signature CSECT in the assigned slot in the language list. If the member is not present in the program, the index for that member's signature CSECT will contain a zero value. When a member's presence is detected, the member's Event Handler is dynamically loaded into virtual memory by CEE. A sample CSECT for a language list containing a list of weak externals is found in FIG. 5.

The Event Handler

The Event Handler is a member-supplied routine that is invoked, at various times throughoout the execution of a program when a significant event has occurred, or when CEE needs some information that is held by the member. The Event Handler contains the intimate knowledge of the requirements of the member language, but CEE is isolated from the need to know about this type of detail through the use of the invention.

During CEE initialization, the CEE will determine the set of members present in the application. For those members present, CEE will load the Event Handler. The name of the Event Handler is arbitrarily manufactured by concatenating a fixed prefix and the member number. The name constructed is "CEEEVxxx," where xxx is the member number. This name is then used to load the module containing the event handler through standard operating system calls. The address of the Event Handler is saved for later retrieval. The member number is arbitrary, but in the preferred embodiment it corresponds to the slot in the language list for the member.

Using IBM Systems 370 linkage conventions, linkage to the member event handler is via "BALR 14,15" and R1 contains a standard parameter address list. The first parameter always indicates the type of event for which the Event Handler has been called. Additional parameters are dependent upon the special event.

While processing various dump services, the Event Handler is invoked with the dump event code, 7. The dump event code has a function code parameter that describes which dump service is to be performed. The remaining parameters for the dump event vary according to the specific function code.

The Language Utilities event, 6, has a function code parameter that describes what information is being requested. The remaining parameters for the utilities event vary according to the specific function code.

The list of events and their corresponding parameters is presented in Table 1. CEEINT is a symbolic label for a callable entry point in CEE which initializes CEE. CEESTART is a symbolic label which is used to uniquely identify a load module and to navigate the load module for information such as the language list.

TABLE 1

Event Codes and Parameters

| Event | Code | Parm 2 | Parm 3 | Parm 4 | Parm 5 | Parm 6 | Broadcast |
|---|---|---|---|---|---|---|---|
| Condition Processing | 1 | CIB | results | new condition | | | No |
| Enablement processing | 2 | CIB | results | new condition dition | | | No |
| SF 0 Cond Processing | 3 | CIB | results | new condition con- | 0 | | No |
| Option Proc | 4 | Options Block | address of cees-tart | INPL | 512 work | | No |
| Main-opts | 5 | INPL | R13 inbound to CEEINT | R0 inbound to CEEINT | R1 inbound to CEEINT | main-opts | No |
| Process Init | 17 | | | | | | Yes |
| Language Utilities | 6 | functin code | | | | | No |
| Dump Services | 7 | function code | | | | | Yes |
| GOTO Target DSA | 10 | target DSA | | | | | No |
| DSA Exit routine | 11 | dsa of term block | | | | | No |
| Enclave Create | 18 | program mask returned | INPL | member specific thread | | | Yes |
| Enclave Termination | 19 | INPL | | | | | Yes |
| Process Termination | 21 | | | | | | Yes |
| Debugger Info | 16 | | | | | | No |
| ATTERM event | 15 | | | | | | No |
| New Load Load module event | 8 | load module ule | CEES-TART or or 0 | entry point | | | No |

The last column of Table 1 indicates whether the event is to be broadcast to all non-dedug event handlers. The specific embodiment of the invention will determine which events should be broadcast, but in general events which have an effect on the entire enclave should be broadcast. This includes the events associated with process and enclave initialization and termination.

When a targeted event (non-broadcast) is being processed, the associated event handler must be determined. This is preferably done by examining the PPA for the routine which was executing when the event occurred. Any method of member number identifying the language will work. In the preferred embodiment the preassigned member number is placed in the PPA. It is also possible to serially broadcast a utility event until the correct event handler is found.

CEE will invoke member specific initialization routines for process initialization and again for enclave initialization. The resources and capabilities differ between the two events. The following events will be discussed as examples:

process initialization
enclave initialization
process termination
enclave termination
run-time options event
atterm termination event CEE expects its registers to be restored to their original value upon return, conforming to normal calling conventions. The event handler must set the return code in R15 to one of the valid return codes, as follows:

return
code meaning

−4 No action was taken for this event

0 The event was successfully processed

16 The event was not successfully processed and/or the program must be immediately terminated.

CEE ABENDs the program if the event handler returns a value of 16 or a value not in the preceding list.

Process initialization event: Process initialization is event 17. This event is used to bring up HLL portions at the process level. The order in which the member event handlers are invoked is not defined as part or the invention, but may be otherwise constrained.

Upon entry into the member event handler R13 points to a DSA into which the event handler is able to store its caller's registers and R1 contains the address of a standard O/S style plist with a single parameter of event code 17.

A combination of Event 17 and Event 18 should initialize the HLL specific aspects of the environment for a given application. The counterpart for this event is event 21.

Process termination event: The process termination event code is 21. This event is used to terminate HLL portions at the process level. The order in which the member event handlers are invoked is not defined as part of the invention, but may be otherwise constrained.

The plist is an O/S style plist containing the single parameter of the event code for process termination.

This event indicates that the HLL should relinquish all resources maintained at the process level. Note all HLL semantics for a terminating application will have already been accomplished by Event 19—enclave termination event.

The counterpart for this event is event 17.

Enclave initialization event: The enclave initialization event code is 18. This event is used to initialize HLL portions at the enclave level. The order in which the member event handlers are invoked is not defined as part of the invention, but may be otherwise constrained. All CEE services are available at the time of this event. The member can influence the program mask setting by placing its requirements of the program mask into the second parameter as described below. Upon entry into the member event handler for the enclave initialization event, the following is available:

R14,R15 are linkage registers
R12 addresses the CAA
R13 addresses a DSA
R1 contains the address of a standard O/S style plist (all of the parameters are passed by reference) with the following plist:
  1. event code 18
  2. fullword field in which the program mask is held in the right-most bits. Upon input, this field is zero.
  3. Initialization plist (INPL) passed to CEEINT
  4. member specific thread token (when executing under CICS), or zero The combination of Event 17 and Event 18 should initialize the HLL specific aspects of the environment for a given application.

Enclave termination event: The enclave termination event code is 19. This event is used to terminate HLL portions at the enclave level Upon entry into the member event handler, the following is available:

R14,R15 are linkage registers
R13 addresses a DSA
R12 addresses the CAA
R1 contains the address of a standard O/S style plist (all of the parameters are passed by reference) with the plist consisting of the following:
  an event code indicating enclave termination—19
  the initialization parameter list that was passed to CEEINT during CEE initialization.

This call allows the HLL to semantically terminate the application by enforcing the language semantics of a terminating enclave. Enclave related resources should be released. This event is the counterpart of Event 18.

Run-time options event: The run-time options event is number 4. This event has limited capabilities. There is no stack available, nor any CEE callable services. The purpose is to allow the members to handle run-time options in a compatible fashion. The parameter list is as follows:

1. the event code–4
  2. the address of an OCB
  3. the address of CEESTART
  4. the address of the "main" entry point
  5. the address of a 512-byte workarea At-term event: The At-term event is invoked during termination of an enclave. It is invoked after all user stack frames have been removed from the stack and prior to invoking the members for the enclave termination event. Only the members that have been explicitly registered via a call to the CEEATTRM service of CEE will be invoked. The parameter list that is passed to this event consists of a single parameter—the event code, 15.

The Dump Event Handler: Calls to dump event handler are made with parameters shown in the following sample procedure statement:

```
─ General Parameter Format ─────────────
PROCEDURE (dump_event_code, function_code,
[additional_parms], fc)
``` where:
dump_event_code
  is a fullword binary integer with a value of 7.
function_code
  is a fullword binary integer that specifies the dump function to be performed. It must contain one of the following values:
  1 Dump an informational message that explains why the dump is being taken. This function_code specifies that the exit of the language library that called CEE3DMP should print the error message that resulted from the dump being taken in the first place. The informational messages would normally be a copy of the error messages sent to MSGFILE for the error. These messages could contain an ABEND code, the Program Status Word, and register contents at time of the error. If CEE3DMP was not called by a member language library, then member language libraries would normally not print any messages in this exit.
  2 Dump the arguments of a routine. If the member language cannot distinguish between arguments and local variables for a routine, it should dump the arguments at the same time it is called by dump services to dump variables.
  3 Dump the variables of a routine. This includes all local variable and any shred external variables used by the routine. Member language libraries should dump only those variables used or set by the routine if this can be determined.
  4 Dump control blocks associated with a routine. This includes the DSA mapped by the member language and any other control blocks associated with the routine that are useful for debugging. This includes compile information, symbol tables, and statement tables.
  5 Dump storage for a routine. This includes automatic stack frame storage and static local variable storage. Static data storage shared between this routine and another routine should also be dumped. Only one copy of a shared storage area should be dumped though.
  6 Dump control blocks associated with a thread. The CAA for the thread is dumped by CEE.
  7 Dump storage associated with a thread. CEE dumps all stack storage associated with the thread. Member languages may dump any other stack storage that is associated with the thread using this exit. Any stack storage used by the thread is dumped even though it may not be associated with it. Only data storage should be dumped. Storage containing code should not be dumped if possible.
  8 Dump control blocks associated with an enclave. The EDB for the enclave is dumped by CEE as well as the member list. Member languages should dump communications areas that are linked off of the member list. These are usually the static library communications regions that are part of the application load module.

9 Dump storage associated with an enclave. CEE dumps all heap storage associated with the enclave. Member languages may dump any other storage that is associated with the enclave using this exit. This usually includes storage obtained though direct calls to the operating system storage management. Only data storage should be dumped. Storage containing code should not be dumped if possible.

10 Dump status and attributes of files. CEE dumps the status and attributes of files used by message services. Member languages should dump status and attributes of their own files. This includes all currently open files as well as any previously open files in the course of executing an application.

11 Dump control blocks associated with files. Control blocks and other language-specific control blocks that keep file status are dumped.

12 Dump storage buffers associated with files. These buffers are allocated by the operating system and typically do not use CEE heap services. Buffer storage allocated by CEE heap services may be dumped.

13 Dump control blocks associated with the process. The PCB for the process is dumped by CEE.

14 Dump storage associated with the process. Only data storage should be dumped. Storage containing code should not be dumped.

15 Dump any additional global information. This information appears at the end of the dump report. A list of loaded library modules is an example of additional global information.

16 Dump the variables of the enclave. This includes all static external variables use by the enclave.

17 End of dump call. This indicates that there are no additional calls to the event handler for this instance of dump.

additional_parms are parameters specific to a certain function code. The following diagram shows the parameters for each function code: notice that the dump_event_code 7 always precedes the function code.

---

Parameter Format by Function Code

PROCEDURE (7, 1, fc)
PROCEDURE (7, 2, dsaptr, cibptr, caaptr, edbptr, fc)
PROCEDURE (7, 3, dsaptr, cibptr, caaptr, edbptr, fc)
PROCEDURE (7, 4, dsaptr, cibptr, caaptr, edbptr, fc)
PROCEDURE (7, 5, dsaptr, cibptr, caaptr, edbptr, fc)
PROCEDURE (7, 6, caaptr, edbptr, fc)
PROCEDURE (7, 7, caaptr, edbptr, fc)
PROCEDURE (7, 8, edbptr, fc)
PROCEDURE (7, 9, edbptr, fc)
PROCEDURE (7, 10, edbptr, fc)
PROCEDURE (7, 11, edbptr, fc)
PROCEDURE (7, 12, edbptr, fc)
PROCEDURE (7, 13, pcbptr, fc)
PROCEDURE (7, 14, pcbptr, fc)
PROCEDURE (7, 15, edbptr, fc)
PROCEDURE (7, 16, edbptr, fc)
PROCEDURE (7, 17, fc)

--- where:

dsaptr is a fullword binary integer containing the address of a DSA.

cibptr is a fullword binary integer containing the address of the CIB for the routine. This parameter is zero if the routine does not have a CIB.

caaptr is a fullword binary integer containing the address of a CAA.

edbptr is a fullword binary integer containing the address of an EDB.

pcbptr is a fullword binary integer containing the address of a PCB.

fc(output)

A 12-byte feedback code passed by reference. Three conditions may result from this exit, i.e., successful completion, an error in writing messages to the dump file, or member language dump exit was unsuccessful.

Event Handler Utilities Event

Various CEE services, including exception handling, perform language-specific functions. To perform these functions, CEE receives information through the member language utility exit. The utility exit passes CEE the information it needs to perform the required processing. It is actually a part of a member event handler, using event code 6. The description and linkage to the event handler for each of these exits is shown below. All linkages have the event code of 6, followed by a unique function code, followed by parameters specific to the utility.

DSA Ownership

For this exit, a member language specifies if a DSA is associated with a routine owned by or written in it. This exit is used by CEE to determine the owner of code that does not have a PPA-style entry. CEE first checks to see if the code contains a PPA-style entry. The eye catcher of the saved register 15 in the caller's DSA is checked to determine if it points to a CEE entry point. If this is not true, CEE calls member language exits for DSA ownership until a language claims ownership.

---

Parameter Format

PROCEDURE (6, 1, dsaptr, ownership)

--- where:

dsaptr (input)

is a fullword pointer to an active DSA or save area.

ownership (output)

is a fullword binary integer set to contain:
0 The source code corresponding to the DSA is not in the member language.
1 The source code corresponding to the DSA is in the member language.

Entry Point and Compile Unit Identification

For this exit, a member language identifies the entry point name, entry address, compile unit name, compile unit address, and current instruction address for a routine, given the DSA and CIB associated with the routine. This exit is called only if a routine does not have a PPA-style entry.

```
┌─ Parameter Format ─────────────────────────────┐
│ PROCEDURE (6, 2, dsaptr, cibptr, compile_unit_name, │
│ compile_unit_name_length, compile_unit_address,    │
│ entry_name, entry_name_length, entry_address,      │
│ call_instruction_address)                          │
└────────────────────────────────────────────────┘
``` where:
dsaptr (input)
  is a fullword pointer to an active DSA or save area.
cibptr (input)
  is a fullword pointer to the CIB for the current condition, if one exists. Otherwise, this parameter is zero.
compile_unit_name (output)
  is a fixed-length character string of arbitrary length to contain the name or the compile unit containing the routine associated with the DSA. If the compile unit name cannot be determined, this parameter should be set to all blanks. If the compile unit name cannot fit within the supplied string, it should be truncated.
compile_unit_name_length (output)
  is a fullword binary integer containing the length of the compile unit name string on entry and to contain the actual length of the compile unit name placed in the string on exit. If the compile unit name cannot be determined, this parameter should be set to zero. The maximum length a string may have is 256 bytes.
compile_unit_address (output)
  is a fullword binary integer to contain the address of the start of the compile unit. If the compile unit address cannot be determined, this parameter should be set to zero.
entry_name (output)
  is a fixed length character string of arbitrary length to contain the name of the entry point into the routine associated with the DSA. If the entry point name cannot be determined, this parameter should be set to all blanks. If the entry point name cannot fit within the supplied string, it should be truncated.
entry_name_length (output)
  is a fullword binary integer containing the length of the entry point name string on entry and to contain the actual length of the entry point name placed in the string on exit. If the entry point name cannot be determined, this parameter should be set to zero. The maximum length a string may have is 256 bytes.
entry_address (output)
  is a fullword binary integer to contain the address of the entry point. If the entry address cannot be determined, this parameter should be set to zero.
call_instruction_address (output)
  is a fullword binary integer to contain the address of the instruction which transferred control out of the routine. This should either be the address of a calling instruction, such as BALR or BASSM, or the address of an interrupted instruction if control was transferred due to a program interrupt. If the address cannot be determined, this parameter should be set to zero.

Statement Identification
  For this exit, a member language identifies the statement number given an instruction address and the entry address into a routine. Also, the address of the DSA for the routine and the address of the CIB for the routine are passed in case current register contents are also needed to determine the statement number.

```
┌─ Parameter Format ─────────────────────────────┐
│ PROCEDURE (6, 3, entry_address, call_instruction_address, │
│ dsaptr, cibptr, statement_id, statement_id_length)        │
└────────────────────────────────────────────────┘
``` where:
entry_address (input)
  is a fullword binary integer containing the address of an entry point into the routine.
call_instruction_address (input)
  is a fullword binary integer containing the address of an instruction in the statement to be identified.
  Note that this may also be the address or an instruction in a small routine which does not have its own DSA (for example, fetch glue code). In such cases, the small routine is considered an extension of the code for the statement which called the routine. In these cases, the member language should pass back the statement number of the caller of the small routine.
dsaptr (input)
  is a fullword pointer containing the address of the DSA for the routine.
cibptr (input)
  is a fullword pointer containing the address of the CIB for the current condition. If there is no CIB, this parameter will be zero.
statement_id (output)
  is a fixed-length character string of arbitrary length to contain the statement identifier of the instruction pointed to by call_instruction_address. If the statement cannot be determined, this parameter should be set to all blanks. If the statement id cannot fit within the supplied string, it should be truncated.
statement_id_length (output)
  is a fullword binary integer containing the length of the statement id string on entry and the actual length of the statement id placed in the string on exit. If the statement id cannot be determined, this parameter should be set to zero. The maximum length a string may have is 256 bytes.

DSA Classification
  For this exit, a member language identifies the type of DSA that is associated with the procedure.

```
┌─ Parameter Format ──────────────┐
│ PROCEDURE (6, 4, dsaptr, class) │
└─────────────────────────────────┘
``` where:
dsaptr (input)
  is a fullword pointer containing the address of the DSA or save area.
class (output)
  is a fixed binary(31) fullword passed by reference indicating the classification of the passed DSA. The following is the format of the returned fullword. It can be quickly checked to distinguish library code from compiled code identify the member, and allow the members to qualify the type of compiled/library if needed. For example, PL/I can distinguish begin blocks, On units, Procedures, etc.

X'abcd yyzz' where
zz-is the member id with a max of X'FF'
yy-is used by the member to qualify the compiled code type or the library code type
d-is 1 if library code
is 2 if compiled code The return values should be uniquely associated with a DSA owner. The actual assigned values are arbitrary and may be altered without affecting the invention. For example, X'0001 0005' might be assigned to COBOL compiler library routines while X'0002 0005' might be used for COBOL compiled code.

The Debugger Event Handler: The debug event handler must be loadable by CEE with the name "CEEEVDBG." Specification of which debugger to be used is made at execution time by exposing its name to the system for CEE to LOAD. A load failure indicates to CEE that a debugger is not available during the execution of this program. Since the name CEEEVDBG only needs to be unique within the load library, there can be multiple debug event handlers in different load libraries. Only one will be used for any particular execution of a program.

The Debugger Event Handler is loaded and initialized when any one of the following occurs:
An initial command string or PROMPT is discovered and the TEST run-time option is in effect.
The error condition is raised for the first time and the TEST run-time option is in effect with the ERROR sub-option specified.
Any condition is raised for the first time and the TEST run-time option is in effect with the ALL sub-option specified.
A call to CEETEST is made, regardless of the TEST run-time option setting.

CEE will notify the debugger of events via the Debugger Event Handler. The parameter lists are defined in Table 2.

TABLE 2

| Debugger/CEE event handler interface | | | | |
|---|---|---|---|---|
| Debugger Event | Debugger Event Code | parm 2 | parm 3 | parm 4 |
| condition raised | 101 | CIB | result code | |
| goto | 111 | dsa | | |
| enclave init | 118 | creator's edb | | |
| enclave term | 119 | | | |
| debugger term | 121 | | | |
| thread init | 120 | creator's caa | | |
| thread term | 122 | | | |
| external entry | 123 | + +dsa | cmd string | INPL |
| module load | 124 | dsa | module descriptor | |
| module delete | 125 | dsa | module name | |
| storage free | 126 | storage | storage length | |
| condition promote | 127 | CIB | result code | |
| condition goto | 128 | dsa | | |
| attention | 129 | | | |
| debugger program check | 130 | result code | | |
| message redirect | 131 | msg_text | ddname | |
| CALL CEETEST | 132 | + +dsa | cmd string | |

For the terms used in Table 2, the following definitions apply:
module name
halfword prefixed string of the module name being deleted.
module descriptor
is a structure describing the module just loaded. The structure is as follows:
dcl 1 module descriptor,
3 load point pointer,
3 module size fixed,
3 entry point pointer,
3 name length fixed(15),
3 module name char(255);
result code
fixed(31) binary value action for condition manager to take.
storage length
fixed(31) binary value containing the number of bytes of storage.
cmd string
halfword prefixed string containing the debugger command.
msg_text
halfword prefixed string of the text that will be transmitted via CEE message services.
ddname
CL8 string, left justified, padded right with blanks of the target ddname.
INPL
the Initialization Parameter List as passed to CEEINT.
Notes
1. All parameters are passed by reference.
2. ++-requestor's dsa, meaning an hll library routine dsa is likely the requestor of the CEE service or user's dsa.
3. Return codes are placed in register 15
00-success
16-Critical error in the debugger. Do not invoke again.

Using the foregoing specifications the invention may be implemented using standard programming and/or engineering techniques. The resulting program(s) may be stored on disk, diskettes, memory cards, ROM or any other memory device. For execution, the program may be copied into the RAM of the computer. One skilled in the art of computer science will easily be able to combine the software created as described with appropriate general purpose or special purpose computer hardware to create a computer system embodying the invention. While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A computer implemented method for managing event handling for processing events in a computer system, the events having associated parameters and occurring during the execution of a program, the program including routines prepared in a plurality of computer programming languages, the computer system having a common execution environment including an event handling unit and an Event Handler Interface Unit, comprising the steps of:

(a) determining, in a language list processor portion of the event handling unit, which of a plurality of computer programming languages are used in the program from high level language member identifiers for the program;

(b) initializing, in an event handler initializer portion of the event handling unit, based on the step of determining, a plurality of event handling means (event handlers) such that an event handler compatible with each computer programming language used in the program is initialized;

(c) detecting, in an event detector portion of the event handling unit, an occurrence of a selected event during execution of the program;

(d) determining, in the event handler interface unit, the computer programming language used in a currently executing routine and the associated parameters for the selected event;

(e) invoking, using the event handler interface unit, the initialized event handler compatible with the computer programming language used in the currently executing routine and passing an identifying event code and the associated parameters to said initialized event handler to cause the event to be handled, wherein the common execution environment is a single-run time environment; and (f) repeating steps (c)–(e) each time a selected event occurs.

2. The method of claim 1, further comprising the steps of:

determining, in the event handler interface unit, whether the selected event is of a broadcast type which must be sent to all initialized event handlers; and invoking in turn, using the event handler interface unit, for each broadcast type event, each initialized event handler not previously invoked by passing an identifying event code and the associated parameters to each initialized event handler for processing.

3. The method of claim 1, wherein the step of determining said plurality of computer programming languages used in said program further comprises determining said plurality of computer programming languages from high level language member identifiers contained in at least one program prologue area.

4. The method of claim 1, wherein said initializing step further comprises the steps of:

building an assigned name for each event handler using the high level language member identifiers; and loading, from memory into the computer system each event handler using the assigned name.

5. The method of claim 1, further comprising the step of receiving, using the event handler interface unit, a return code from the event handler, the return code having a value indicative of success, non-processing or failure of processing of the event.

6. The method of claim 1, further comprising the step of receiving, using the event handler interface unit, return information from the event handler, said return information indicative of DSA Ownership, Entry Point and Compile Unit Identification, Statement Identification, or DSA Classification.

7. The method of claim 1, further comprising the step of initializing, using the event handling unit, a debug event handler.

8. The method of claim 7 wherein the system is capable of detecting error conditions, and the step of initializing the debug event handler is responsive to an initial command string, an error condition, or an express request from the program.

9. A computer implemented method for handling events for a computer programming language in a computer system having a processor, a common execution environment (CEE) having an event handling unit and an event handler interface unit, and an event handler, comprising the steps of:

(a) receiving, in the Event Handler Interface Unit, an Event Code and parameters corresponding to an event from the CEE;

(b) determining, in the event handler interface unit, whether the Event Code requires any information, including stack frame ownership information, entry point information, compile unit identification information, or a statement number which corresponds to an address from the event handler, responsive thereto finding the required information; and (c) returning to the CEE any information found in step (b), wherein the CEE is a single-run time environment.

10. A computer system for handling events occurring during the execution of a program, the program including routines prepared in a plurality of computer programming languages, comprising:

means for determining which of a plurality of computer programming languages are used in the program from high level language member identifiers for the program;

means for initializing an event handling means (event handler) compatible with each computer programming language;

means for detecting an occurrence of a selected event during execution of the program;

means for determining the computer programming language used in a currently executing routine and parameters associated with the selected event; and means for invoking an event handler compatible with the computer programming language used in the currently executing routine and passing an identifying event code and the associated parameters to the event handler to cause the event to be handled, wherein said identifying event code and said associated parameters are passed to the event handler through a common execution environment, and wherein said common execution environment is a single-run time environment.

11. The system of claim 10 further comprising:

means for determining whether the selected event is of a broadcast type which must be sent to all initialized event handlers; and means for passing, for all broadcast type events, an identifying event code and the associated parameters to all initialized event handlers.

12. The system of claim 10 further comprising means for determining an event handler to which to pass the event code and the parameters using high level language member identifiers taken from a program prologue area.

13. The system of claim 10 wherein the means for initializing further comprises:

means for building a name for each event handler by using a preassigned member identifier; and means for requesting dynamic loading of each event handler using the name.

14. The system of claim 10, further comprising means for receiving a return code from the event handler, the return code having a value indicative of success, non-processing or failure of processing of the event.

15. The system of claim 10 further comprising means for receiving return information from the event handler indicating DSA Ownership, Entry Point and Compile Unit Identification, Statement Identification, or DSA Classification.

16. The system of claim 10 further comprising means for initializing a debug event handler.

17. The system of claim 16 wherein the means for initializing the debug event handler is responsive to an initial command string, an error condition, or an express request from the program.

* * * * *